Aug. 22, 1961  D. F. LINSLEY  2,997,148
ROTATABLE TOOL WITH CLUTCH
Filed Nov. 10, 1958  2 Sheets-Sheet 2

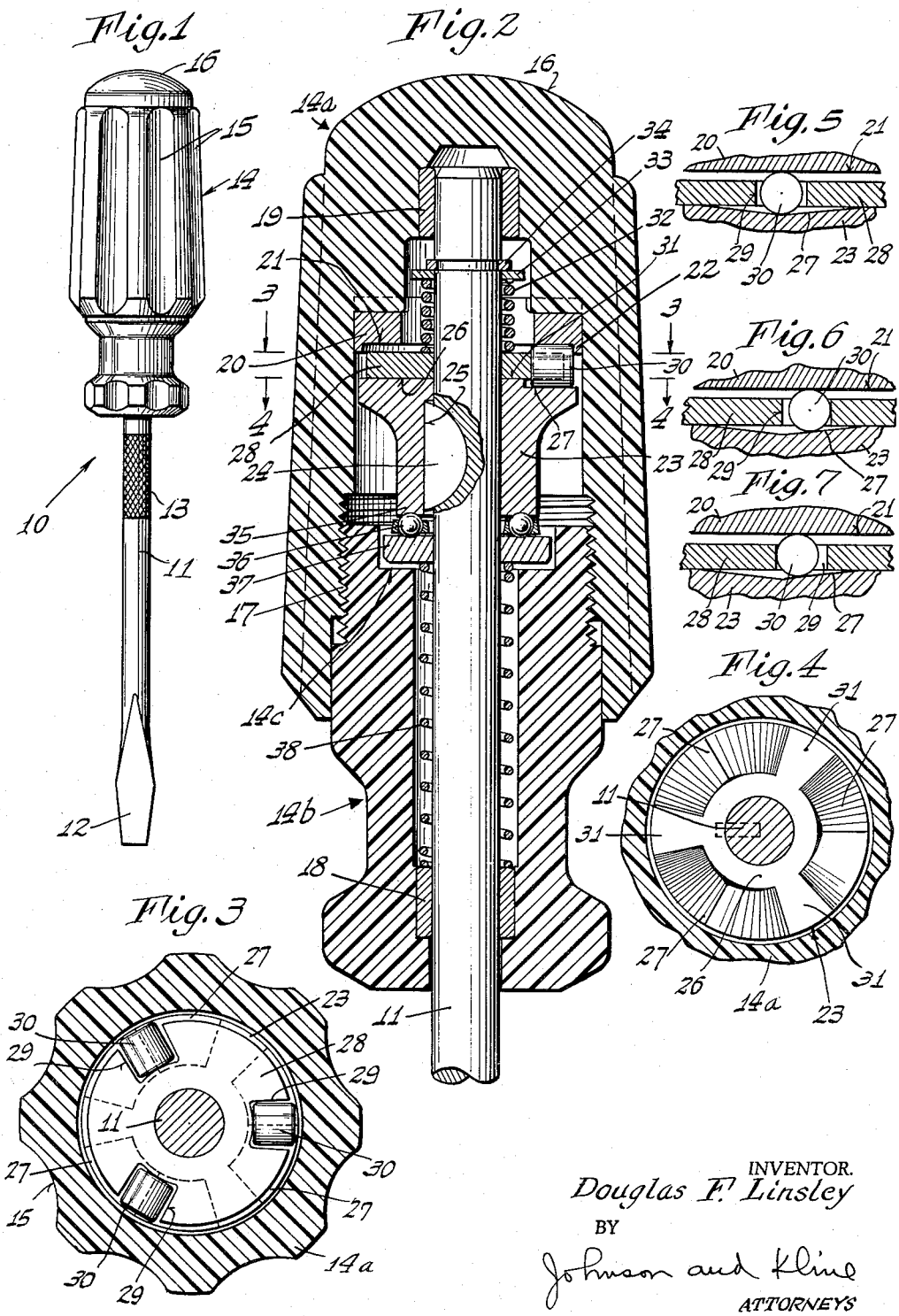

INVENTOR.
Douglas F. Linsley
BY
Johnson and Kline
ATTORNEYS

United States Patent Office 2,997,148
Patented Aug. 22, 1961

2,997,148
ROTATABLE TOOL WITH CLUTCH
Douglas F. Linsley, Westport, Conn., assignor to Morgan Development Laboratories, Inc., Westport, Conn., a corporation of Delaware
Filed Nov. 10, 1958, Ser. No. 773,047
12 Claims. (Cl. 192—44)

The present invention relates to a tool such as a screw driver having a rotatable working bit and more specifically to a novel bidirectional clutch incorporated therein.

The screw driver, as the specific tool disclosed in the embodiment of the present invention hereinafter appearing, is of the type which has a handle and a shaft with a bidirectional clutch interposed therebetween. The clutch enables locking rotation between the handle and the shaft, in either direction with free rotation in the other direction, with the locking between them being caused by an axial pressure on the handle and rotation, and the unlocking by a relaxing of the pressure and reverse rotation.

While a bidirectional clutch achieving the above recited results between the handle and the shaft has heretofore been proposed, it has been found that these prior proposed constructions contained a relatively large number of parts which necessarily rendered the tool somewhat expensive. In addition, the prior proposed constructions have required stronger parts by reason of the clutch employing a radial outwardly, expansive force to cause the locking of the members and to contain the radial force, quite large and rugged parts were necessary, they being objectionable both in cost and size (by reason of requiring a large handle) and having a tendency to break when under heavy load.

It is accordingly an object of the present invention to provide a tool, having a rotatable shaft and a rotatable handle with relative movement and locking therebetween by a clutch, which is economical to manufacture, has a minimum number of parts and in which the parts may be economically fabricated and assembled.

Another object of the present invention is to provide a tool of the above type which has clutch members which utilize an axially compressive force to cause locking of the handle to the shaft thereby eliminating the necessity of containing radial forces with its attendant disadvantages.

A further object of the present invention is to provide a clutch which requires a relatively heavy axial pressure to cause setting of the clutch for locking rotation of the parts in either direction and a lighter axial pressure for locking movement in the set direction.

In attaining the above objects the present invention is specifically disclosed in a screw driver having a handle and a shaft terminating in a bit. The handle and the shaft are axially aligned with a clutch interposed therebetween, the clutch including a clutch cam secured to the shaft having a radially extending face formed to have axially depressed wedge surfaces, rollers positioned on the surfaces and a roller cage maintaining the rollers equispaced. The handle carries a pressure plate which has a radially extending face that frictionally engages the rollers and causes them to be moved along the wedge surfaces. Axial pressure on the handle toward the bit of the shaft causes the pressure plate to sufficiently frictionally engage the rollers and move them as the handle is rotated, on the wedge surfaces to cause a wedginig action between the pressure plate and the clutch cam to lock the handle to the shaft and cause rotation of the shaft with the handle. Upon reverse movement of the handle, without the application of axial pressure, the rollers are moved down the wedge surface, releasing the wedging action between the pressure plate and clutch cam, thereby enabling the handle to rotate independently of the shaft.

By having the rollers compressed between the radially extending face of the pressure plate and the axially depressed wedge surfaces formed in the radially extending face of the clutch cam, the compressive force on the circumference of the rollers is in an axial direction. Since a screw driver is constructed to be strongest along its length, i.e. in an axial direction, the forces produced by the clutch of the present invention are thereby easily contained without requiring extensive, if any, strengthening of the parts.

A further feature of the present invention is the minimizing of lost motion or play that arises when the clutch changes from one condition to another. This is accomplished by initially moving the cage that contains the rollers to a position which enables locked movement in one direction and maintaining it stationary while the handle moves freely in the reverse direction with only the rollers moving slightly within the confines of the cage from a locked to an unlocked condition.

Other features and advantages will hereinafter appear.

In the drawing:

FIGURE 1 is an elevation of the clutch of the present invention shown incorporated in a tool, specifically a screw driver.

FIG. 2 is an axial section of the tool.

FIG. 3 is a radial section taken on the line 3—3 of FIG. 2.

FIG. 4 is a radial section taken on the line 4—4 of FIG. 2.

FIG. 5 is a detail of the clutch in neutral position.

FIG. 6 is a detail of the clutch in locked position.

FIG. 7 is a detail of the clutch in set but released position wherein free rotational movement between the handle and the shaft occurs in a direction reverse to the direction in which the clutch locks.

Figure 8:
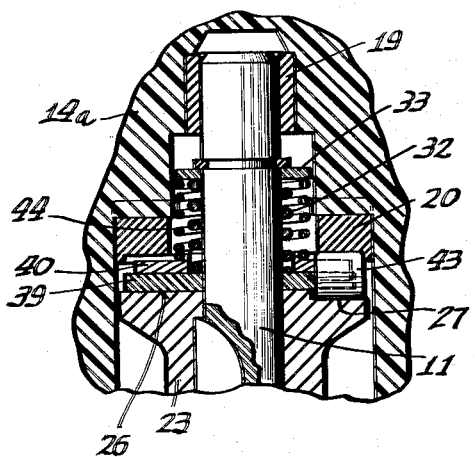
FIG. 8 is an axial section of a further embodiment of the invention.
Figure 9:
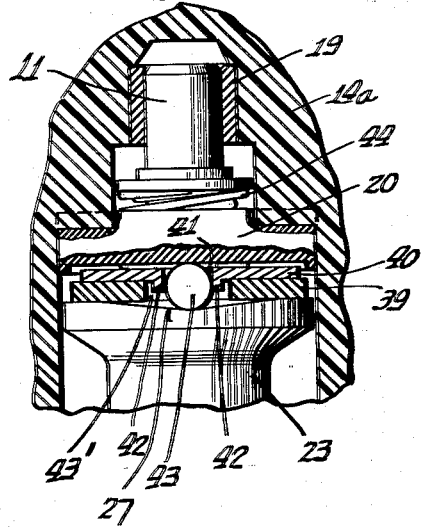
FIG. 9 is an elevation, partly in section, of the embodiment shown in FIG. 8.

Referring to the drawing, the tool of the present invention is generally indicated by the reference numeral 10 and in the specific embodiment shown is a screw driver, though other tools having a rotatable driving part and a rotatable driven part may have incorporated therein the clutch of the present invention. The screw driver has a shaft 11 terminating in a work bit 12 and a knurled surface 13 which may be used for finger rotating of the shaft. The shaft projects into a handle 14 having flutes 15 and a rounded end 16 for enabling grasping and rotation by hand.

As shown in FIG. 2, the handle comprises two pieces, an upper piece 14a and a lower piece 14b which are threaded together as at 17 and may be secured after assembly of the parts as by glue, bonding, etc. to become unitary. Preferably the handle portions are formed of a molded plastic material which has molded therein bushings 18 and 19 that surround the shaft 11 and form bearings therefor. A pressure plate 20 having a flat radially extending surface 21 and an outer circular depending flange 22 is secured to the upper portion 14a of the handle, preferably by being molded therein.

The shaft has secured thereon a clutch cam 23 as by a half-moon key 24 which extends into a slot 25 formed in the clutch cam. The clutch cam has a flat radially extending face 26 (see FIG. 4) in which are formed three, axially depressed, wedge surfaces 27 which are shown as being substantially V-shaped and symmetrical. A V-shaped depression enables bidirectional movement of the clutch though if only a unidirectional clutch is desired, only one inclined surface need be provided. A roller cage 28, having peripheral cutouts 29 in which are positioned cylindrical rollers 30, has a flat face 31 engaging the face 26. To maintain a determinable frictional engagement between the faces 26 and 31, a spring 32 encircles the shaft and at one end engages the plate 28 while its other end engages a washer 33 held in place on the shaft 11 by a split ring 34; the parts are dimensioned to place the spring 32 in compression to force the two faces 26 and 31 together.

The other end 35 of the clutch cam 23 is formed radially flat and a roller bearing 36 is positioned between it and a washer 37. A spring 38 forces the washer against the bearing 36 with a force substantially less than the force exerted by the spring 32 but of an amount sufficient to maintain the washer bearing and clutch cam in engagement. This spring also causes (through its engagement with the handle) the pressure plate to exert a predetermined axial force on the rollers that is less than that required to move the roller cage.

The handle portion 14b is formed to have a radially extending ledge 14c which is spaced a predetermined distance from the washer 37 with the distance being set by the length of threaded engagement between the handle portions.

In the operation of the device, with the parts positioned in the neutral position, as shown in FIG. 5, the handle may be freely rotated relative to the shaft in either direction. Though the surface 21 engages each roller and the rollers tend to move with the pressure plate there is insufficient compression on the rollers to cause a lock between the pressure plate and the clutch cam. Also there is insufficient friction on the rollers to cause them to move the roller cage and hence the rollers only move within their cutouts 29 in the roller cage at the bottom of the wedge shaped surfaces. To lock the handle to the shaft to rotate it in a counterclockwise direction, for example, sufficient axial pressure must be placed on the handle to increase the friction between the rollers, the pressure plate and the wedge surfaces on the clutch cam to cause the rollers to move the roller cage (by overcoming the frictional resistance existing between the faces 26 and 31 caused by the spring 32) as the handle is rotated. This may be referred to as a setting axial pressure and with a rotating motion, it sets the clutch by moving the roller cage to a position shown in FIG. 6 wherein each roller is wedged between the pressure plate and the wedge surface at one side of the cutout sufficiently to effect a lock between the handle and the shaft. The ledge 14c and the pressure plate are maintained a determinate axial distance apart by reason of the handle and when the handle and shaft are locked together, the washer 37 engages the ledge 14c while the pressure plate engages the rollers. Accordingly as the rollers ride up the wedge surfaces, the axial distance between the pressure plate engaging surface of the rollers and the washer 37 tends to increase but is contained by the distance between the ledge 14c and the pressure plate thereby causing the wedging action.

If desired to freely rotate the handle in a clockwise direction, without movement of the shaft, the axial pressure on the handle is relieved, the friction between the faces 31 and 26 holding the roller cage stationary, while the rollers move with the handle to the position shown in FIG. 7 in which they are at the other side of the cutout and the lock between the handle and shaft is released. To move the handle and shaft locked together in the same set direction (counterclockwise) again, the handle needs merely to be rotated without the setting axial pressure since it is only necessary to move the roller in a radial plane from one side of the cutout to the other without moving the roller cage and sufficient pressure is exerted by spring 38 to cause the necessary friction to exist between the pressure plate and the rollers.

It will be appreciated that the cutouts in the roller cage in which each roller is maintained are sufficiently wide to enable the roller to move on the wedge surface from a locked to a released condition of the clutch without movement of the roller cage.

If it is desired to rotate the shaft and handle locked together in the other direction, the setting axial pressure is exerted on the end of the handle to cause sufficient friction between the rollers, the pressure plate, and the wedge surfaces to cause the rollers to move with the pressure plate overcoming the frictional resistance between the roller cage and the clutch cam to move the roller cage to the set position on the opposite side of the wedge surface. After the roller cage is set for locking movement in this opposite direction, the handle is free to be rotated in the reverse direction in the same manner as heretofore explained.

The relative rotational movement between the handle and the shaft is easily accommodated by the bearing 36, particularly when reversing after a heavy driving torque, and also the bushings 18 and 19 which are preferably oil impregnated. It will be appreciated that when locking the clutch the handle and shaft move axially with respect to each other. This movement is equal to the distance between the washer 37 and the ledge 14c and thus when locked the washer 37 abuts the ledge 14c.

Figure 10:
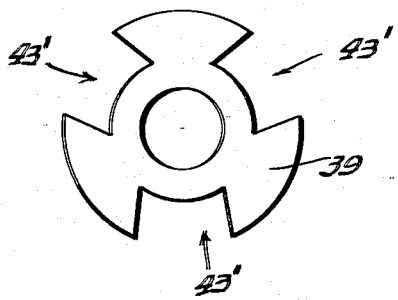
FIG. 10 is a detail of a part of FIG. 9.

Shown in FIG. 8 is a further embodiment of the roller cage of the present invention which causes all the rollers to be equally moved together equal amounts whereas the previously described embodiment lets each roller move independently of the others in its own cutout. To this end, the roller cage is composed of two pieces, a friction plate 39 and a floating roller cage 40. The floating roller cage 40 is provided with cutouts 41 having depending flanges 42 which closely confine its associated roller 43. The friction plate 39 has gaps 43' formed therein (see FIG. 10) into which the flanges 42 extend. The gaps 43 are of sufficient width to enable movement of the flanges of the floating roller cage from one side to the other to effect locked and unlocked conditions of the rollers. The spring 32 extends through the floating roller cage and bears against the friction plate to create the necessary frictional resistance between it and the face 26 of the clutch cam. If desired, a light spring 44 may engage the floating roller cage with its sole purpose being to maintain the floating roller cage and friction plate in position with a minimum of friction therebetween.

It will be appreciated that the clutch of the present invention when incorporated in a screw driver is capable of readily withstanding purely axial forces, such as a hammer blow on the end 16. The axial force passes from the handle to the shaft through the pressure plate, rollers, wedge surfaces, clutch cam and the key 24.

It will accordingly be appreciated that there has been disclosed a bidirectional clutch which is specifically shown incorporated in a screw driver which enables rotation of the driven member locked to the driving member in either direction and yet free rotation in the reverse direction. This is simply and effectively accomplished by initially applying an axial pressure on the driving member together with rotation which sets the clutch in the desired direction and thereafter locked movement in this direction and free relative movement in the reverse direction as a result of a lesser axial pressure on the driving member is accomplished with a minimum of idle motion. The clutch of the present invention is composed of relatively few parts, is simple in design and by reason of the compressive force on the rollers being axial, requires smaller parts since there is no radial expansive force to contain.

Variations and modifications may be made within the scope of the claims and portions of the improvements may be used without others.

I claim:

1. A clutch for use with a tool having a rotatable driving member and a rotatable driven member connected together to permit relative axial movement comprising a clutch cam secured to one of the members and having a radially extending face, at least one axially depressed, inclined surface formed in the face, a roller rotatable about an axis perpendicular to the axis of the member and having a portion engaging the inclined surface, a roller cage for containing the roller, a pressure plate secured to the other member and having a radially extending pressure surface frictionally engageable with a portion of the roller, means mounting the clutch cam and pressure plate for relative axial movement therebetween and means for urging the clutch cam and pressure plate towards each other to maintain their engagement with the roller whereby rotation of the driving member moves the roller along the inclined surface to cause locking by the roller between the pressure plate and the clutch cam, said locking tending to cause relative axial movement of the clutch cam and pressure plate in a direction away from each other and abutting means for limiting the relative axial movement.

2. A clutch for use with a tool having a rotatable driving member and a rotatable driven member connected together to permit relative axial movement comprising a clutch cam secured to one of the members and having a radially extending face, at least one axially depressed wedge surface formed in the face, a roller cage positioned adjacent the face and being formed with at least one cutout extending axially therethrough, a roller movable in a radial plane positioned within the cutout, said roller having a portion extending beyond each side of the roller cage with one portion engaging the wedge surface, a pressure plate secured to the other member and having a radially extending pressure surface frictionally engageable with the other portion of the roller, means mounting the clutch cam and pressure plate for relative axial movement therebetween and means for urging the clutch cam and pressure plate towards each other to maintain their engagement with the roller whereby rotation of the driving member moves the roller along the wedge surface to cause locking by the roller between the pressure plate and the clutch cam, said locking tending to cause relative axial movement of the clutch cam and pressure plate in a direction away from each other and abutting means for limiting the relative axial movement.

3. A bidirectional clutch for use with a tool having a rotatable driving member axially aligned with a rotatable driven member and connected together to permit relative axial movement comprising a clutch cam secured to one of the members and having a radially extending face, at least one axially depressed substantially V-shaped wedge surface formed in the face, a roller cage positioned adjacent the face and being formed with at least one cutout extending axially therethrough, a roller movable in a radial plane positioned within the cutout, said roller having a portion extending beyond each side of the roller cage with one portion engaging the wedge surface, a pressure plate secured to the other member and having a radially extending pressure surface frictionally engageable with the other portion of the roller, means mounting the clutch cam and pressure plate for relative axial movement therebetween and means for urging the clutch cam and pressure plate towards each other to maintain their engagement with the roller whereby an axial force urging the clutch cam towards the pressure plate simultaneously with rotation of the driving member in either direction moves the roller along the wedge surface to cause locking by the roller between the pressure plate and the clutch cam for movement of the driven member in the same direction, said locking tending to cause relative axial movement of the clutch cam and pressure plate in a direction away from each other and abutting means for limiting the relative axial movement.

4. A clutch for use with a tool having a rotatable driving member axially aligned with a rotatable driven member and connected together to permit relative axial movement comprising a clutch cam secured to one of the members and having a radially extending face, three equispaced, axially depressed wedge surfaces formed in the face, a roller cage positioned adjacent the face and being formed with three equispaced cutouts extending axially therethrough, a roller movable in a radial plane positioned within each cutout, each roller having a portion extending beyond each side of the roller cage with one portion of each roller engaging its associated wedge surface, a pressure plate secured to the other member and having a radially extending pressure surface frictionally engageable with the other portion of the rollers, means mounting the clutch cam and pressure plate for relative axial movement therebetween and means for urging the clutch cam and pressure plate towards each other to maintain their engagement with the rollers whereby rotation of the driving member moves the rollers along the wedge surfaces to cause locking by the rollers between the pressure plate and the clutch cam, said locking tending to cause relative axial movement of the clutch cam and pressure plate in a direction away from each other and abutting means for limiting the relative axial movement.

5. A clutch for use with a tool having a rotatable driving member axially aligned with a rotatable driven member and connected together to permit relative axial movement comprising a clutch cam secured to one of the members and having a radially extending face, at least one axially depressed wedge surface formed in the face, a roller cage positioned adjacent the face and being formed with at least one cutout extending axially therethrough, a roller movable in a radial plane positioned within the cutout, said roller having a portion extending beyond each side of the roller cage with one portion engaging the wedge surface, a pressure plate secured to the other member and having a radially extending pressure surface frictionally engageable with the other portion of the roller, means mounting the clutch cam and pressure plate for relative axial movement therebetween and means for urging the clutch cam and pressure plate towards each other to maintain their engagement with the roller whereby rotation of the driving member moves the roller along the wedge surface to cause locking by the roller between the pressure plate and the clutch cam, said locking tending to cause relative axial movement of the clutch cam and pressure plate in a direction away from each other, abutting means for limiting the relative axial movement and bearing means engaging the clutch cam and the abutting means for facilitating relative rotation between the two members.

6. A clutch for use with a tool having a rotatable driving member and a rotatable driven member comprising a clutch cam secured on one of the members and having a face formed with at least one axially inclined surface, a roller having a portion engaging the inclined surface, a roller cage having a face frictionally engaging the face of the clutch cam and having means for containing the roller, a pressure plate secured to the other member and having a pressure surface frictionally engaging a portion of the roller, said roller containing means being substantially larger than the roller to enable the roller to move along the inclined surface from one extreme position in the means to another wherein the roller engages a portion of the roller containing means to the other position wherein it engages an opposite portion of the roller containing means, one of said positions being the locked condition and the other the unlocked condition of the clutch, and means for forcing the roller cage into frictional contact with the clutch cam to prevent movement of the cage between the locked and unlocked conditions of the clutch whereby said roller cage remains substantially stationary upon reverse free rotation of the driving member when insufficient axial pressure is exerted thereon to move the roller cage.

7. A clutch for use with a tool having a rotatable driving member and a rotatable driven member comprising a clutch cam secured on one of the members and having a face formed with at least one inclined surface, a roller cage having a face positioned against and frictionally engaging the face of the clutch cam and formed to have a cutout extending therethrough, a roller positioned in the cutout and having a portion extending beyond each face of the roller cage with one portion engaging the inclined surface, a pressure plate secured to the other member and having a pressure surface frictionally engaging the other portion of the roller, said cutout being substantially larger than the roller to enable the roller to move along the inclined surface from one extreme position in the cutout to the other, one of said positions being the locked condition and the other the unlocked condition of the clutch, and means for forcing the roller cage into frictional contact with the clutch cam to prevent movement thereof between the locked and unlocked conditions of the clutch whereby said roller cage remains substantially stationary upon reverse free rotation of the driving member when insufficient axial pressure is exerted thereon to move the roller cage.

8. The invention as defined in claim 7 in which the roller cage consists of a substantially flat annular member.

9. The invention as defined in claim 7 in which the roller cage consists of two substantially flat annular members, one of said members having the above-mentioned cutout and the other member having flanges closely confining the roller and extending into the cutout, whereby said cutouts normally limit the movement of the flanges and hence the roller.

10. The invention as defined in claim 9 in which the one member has the face engaging the face of the clutch cam and the other member is in engagement with the one member but relatively freely movable thereto.

11. A bidirectional clutch for use with a tool having a rotatable shaft and a rotatable driving member comprising a clutch cam secured on the shaft and having a face formed with at least one substantially V-shaped, symmetrical indented wedge surface, a roller cage having a face positioned against and frictionally engaging the face of the clutch cam and formed to have a cutout extending therethrough, a roller positioned in the cutout and having a portion extending beyond each side of the roller cage with one portion engaging the wedge surface, a pressure plate secured to the driving member and having a pressure surface frictionally engaging the other portion of the roller extending on the other side of the roller cage, the friction between the roller and the roller plate being increased by an axial pressure on the member, said cutout being substantially larger than the roller to enable the roller to move along the wedge surface from one extreme position in the cutout to the other, one of said positions being the locked condition and the other the unlocked condition of the clutch, and means for forcing the roller cage into frictional contact with the clutch cam to prevent movement thereof between the locked and unlocked conditions of the clutch whereby said roller cage remains substantially stationary upon reverse rotation of the driving member when insufficient axial pressure is exerted thereon to move the roller cage and in which the roller cage is moved by the rollers when sufficient axial pressure is exerted on the member as it is rotated to overcome the friction caused by the means for forcing the roller cage against the clutch cam.

12. A bidirectional clutch for use with a tool having a rotatable shaft and a rotatable driving member comprising a clutch cam secured on the shaft and having a radially extending face formed with at least one axially indented, substantially V-shaped symmetrical wedge surface, a roller cage having one radially extending face positioned against and frictionally engaging the face of the clutch cam and formed to have a cutout extending therethrough, a roller positioned in the cutout and having a portion extending beyond each side of the roller cage with one portion engaging the wedge surface, a pressure plate secured to the driving member and having a radially extending pressure surface frictionally engaging the other portion of the roller extending on the other face of the cage, said cutout being substantially larger than the roller to enable the roller to move along the wedge surface from one extreme position in the cutout to the other, one of said positions being the locked condition and the other the unlocked condition of the clutch, and means for forcing the roller cage into frictional contact with the clutch cam to prevent movement thereof between the locked and unlocked conditions of the clutch whereby said roller cage remains substantially stationary upon reverse free rotation of the driving member when insufficient axial pressure is exerted thereon to overcome the friction between the roller cage and the clutch cam.

References Cited in the file of this patent

UNITED STATES PATENTS

| | | |
|---|---|---|
| 432,348 | Wild | July 15, 1890 |
| 564,250 | Knowlton | July 21, 1896 |
| 2,061,288 | Murray | Nov. 17, 1936 |
| 2,815,837 | Morgan | Dec. 10, 1957 |